United States Patent
Thackery et al.

(10) Patent No.: US 10,306,843 B2
(45) Date of Patent: *Jun. 4, 2019

(54) BACKPACK LEAF BLOWER

(71) Applicant: Techtronic Outdoor Products Technology Limited, Hamilton (BM)

(72) Inventors: Clinton C. Thackery, Clemson, SC (US); Charles K. Long, Seneca, SC (US)

(73) Assignee: TECHTRONIC OUTDOOR PRODUCTS TECHNOLOGY LIMITED, Hamilton (BM)

( * ) Notice: Subject to any disclaimer, the term of this patent is extended or adjusted under 35 U.S.C. 154(b) by 78 days.

This patent is subject to a terminal disclaimer.

(21) Appl. No.: 14/868,799

(22) Filed: Sep. 29, 2015

(65) Prior Publication Data

US 2016/0014973 A1  Jan. 21, 2016

Related U.S. Application Data

(62) Division of application No. 13/544,700, filed on Jul. 9, 2012, now Pat. No. 9,167,751.

(51) Int. Cl.

| | |
|---|---|
| *A01G 20/30* | (2018.01) |
| *A47L 5/36* | (2006.01) |
| *A01G 20/43* | (2018.01) |
| *A01G 20/47* | (2018.01) |
| *A47L 5/14* | (2006.01) |

(52) U.S. Cl.
CPC .......... *A01G 20/30* (2018.02); *A01G 20/43* (2018.02); *A01G 20/47* (2018.02); *A47L 5/36* (2013.01); *A47L 5/14* (2013.01)

(58) Field of Classification Search
CPC .......... A01G 1/125; A01G 1/12; A01G 20/30; A01G 20/43; A47L 5/36; A47L 5/14; A47L 9/22
See application file for complete search history.

(56) References Cited

U.S. PATENT DOCUMENTS

| | | |
|---|---|---|
| 5,052,073 A | 10/1991 | Iida |
| 5,267,371 A | 12/1993 | Soler et al. |
| 5,813,088 A | 9/1998 | Wagner et al. |
| 6,647,586 B2 | 11/2003 | Rogers et al. |
| 6,928,693 B1 | 8/2005 | Ericson |
| D537,583 S | 2/2007 | Crevling, Jr. et al. |

(Continued)

FOREIGN PATENT DOCUMENTS

WO    2007025115    3/2001

OTHER PUBLICATIONS

Extended European Search Report for Application No. 13168431.8 dated Jan. 30, 2014 (23 pages).

(Continued)

*Primary Examiner* — Robert J Scruggs
(74) *Attorney, Agent, or Firm* — Michael Best & Friedrich LLP

(57) ABSTRACT

A leaf blower to be worn by a user. The leaf blower including a frame having a back plate defining a back plate plane and a blower system coupled to the frame. The blower system includes a motor having drive shaft, the drive shaft defining an axis, and the axis forms an angle with respect to the back plate plane between about 5 degrees and about 35 degrees.

5 Claims, 4 Drawing Sheets

(56) References Cited

U.S. PATENT DOCUMENTS

| | | |
|---|---|---|
| D538,491 S | 3/2007 | Pan |
| D556,395 S | 11/2007 | Martin et al. |
| D584,461 S | 1/2009 | Sweeney |
| 7,600,290 B1 | 10/2009 | Peters |
| 7,685,673 B2 | 3/2010 | Kremsler et al. |
| 7,703,645 B2 * | 4/2010 | Moskun .................. A45F 3/08 |
| | | 224/579 |
| D615,716 S | 5/2010 | Tinius |
| 7,721,384 B2 | 5/2010 | Crevling, Jr. et al. |
| 7,735,188 B2 | 6/2010 | Shaffer |
| D634,418 S | 3/2011 | Li |
| 9,167,751 B2 * | 10/2015 | Thackery .................. A47L 5/36 |
| 2002/0174511 A1 | 11/2002 | Iida et al. |
| 2006/0059873 A1 | 3/2006 | Scully et al. |
| 2007/0044270 A1 * | 3/2007 | Crevling, Jr. ............. A47L 5/14 |
| | | 15/327.5 |
| 2007/0294855 A1 | 12/2007 | Iida et al. |
| 2008/0172826 A1 | 7/2008 | Rappin |
| 2011/0056047 A1 * | 3/2011 | Schliemann .......... E01H 1/0809 |
| | | 15/405 |
| 2011/0146023 A1 | 6/2011 | Wada et al. |
| 2011/0289718 A1 * | 12/2011 | Basenberg, Jr. .......... A45F 3/14 |
| | | 15/327.5 |
| 2014/0007370 A1 | 1/2014 | Thackery et al. |

OTHER PUBLICATIONS

European Patent Office Search Report for Application No. 18156352.9 dated Nov. 12, 2018, 10 pages.

* cited by examiner

BACKPACK LEAF BLOWER

CROSS-REFERENCE TO RELATED APPLICATIONS

This application is a divisional of co-pending U.S. patent application Ser. No. 13/544,700, filed Jul. 9, 2012, the entire contents of which are incorporated herein by reference.

BACKGROUND OF THE INVENTION

The present invention relates to a leaf blower and, more particularly, to a backpack leaf blower.

A leaf blower is a gardening tool that propels air out of a nozzle to move yard debris, such as leaves, twigs, and the like. Typically, these devices include a power source, such as an internal combustion or electric motor, driving a blower that in turn exhausts air under pressure. In most leaf blower designs, the air exhausted from the blower must travel through some type of elbow or bend before it can be directed through the output, reducing efficiency of the device. Furthermore, existing leaf blower designs generally position the motor (usually the heaviest part of the leaf blower) far away from the user's back, increasing the strain on the user and making the device uncomfortable to wear.

SUMMARY OF THE INVENTION

In some embodiments, the invention includes a leaf blower to be worn by a user, the leaf blower including a frame having a back plate defining a back plate plane and a blower system coupled to the frame. The blower system includes a motor having a drive shaft, the drive shaft defining an axis, and wherein the axis forms an angle with respect to the back plate plane between about 5 degrees and about 35 degrees.

In other embodiments, the invention includes a leaf blower to be worn by a user, the leaf blower including a frame having a back plate and a base plate extending from the back plate, wherein an angle is formed between the back plate and the base plate. The leaf blower also includes a blower system coupled to the base plate of the frame. Further, the angle between the back plate and the base plate is between about 55 degrees and about 85 degrees.

In still other embodiments, the invention includes a leaf blower to be worn by a user, the leaf blower including a frame having a back plate defining a back plate plane and a blower system coupled to the frame. The blower system includes a housing defining a chamber and an impeller at least partially positioned within the chamber and having an axis of rotation. The housing defines a working plane substantially perpendicular the axis of rotation of the impeller, wherein the working plane of the housing forms an angle with respect to the plane of the back plate between about 55 degrees and about 85 degrees.

In still other embodiments, the invention includes a leaf blower to be worn by a user, the leaf blower including a frame and a blower system coupled to the frame. The blower system includes a housing defining a chamber and an impeller at least partially positioned within the chamber and having an axis of rotation. The housing defines a working plane substantially perpendicular the axis of rotation of the impeller. The leaf blower also includes an output tube defining an axis therethrough where the axis of the output tube is substantially aligned with the working plane.

In still other embodiments, the invention includes a leaf blower to be worn by a user, the leaf blower including a frame having a back plate defining a back plate plane, and a blower system coupled to the frame. Where the blower system includes a motor having a center of gravity, and wherein a distance between the back plate plane and the center of gravity is less than half a length of the leaf blower when the distance and the length is measured perpendicularly from the back plate plane.

Other aspects of the invention will become apparent by consideration of the detailed description and accompanying drawings.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate a leaf blower 10 to be worn by a user like a backpack. The leaf blower 10 includes a frame 14, a harness (not shown) for securing the frame 14 to the user, a blower system 18 coupled to the frame 14, and an output hose 22 for directing the blower's exhaust. During use, the blower system 18 produces a high pressure air flow capable of clearing leaves, twigs, and other debris from a given area. In the illustrated embodiment, the orientation of the blower system 18 on the frame 14 allows the output hose 22 to be attached without the use of an elbow or other curved ducting. As such, the present invention has reduced air resistance, which increases the efficiency of the device.

Figure 1:
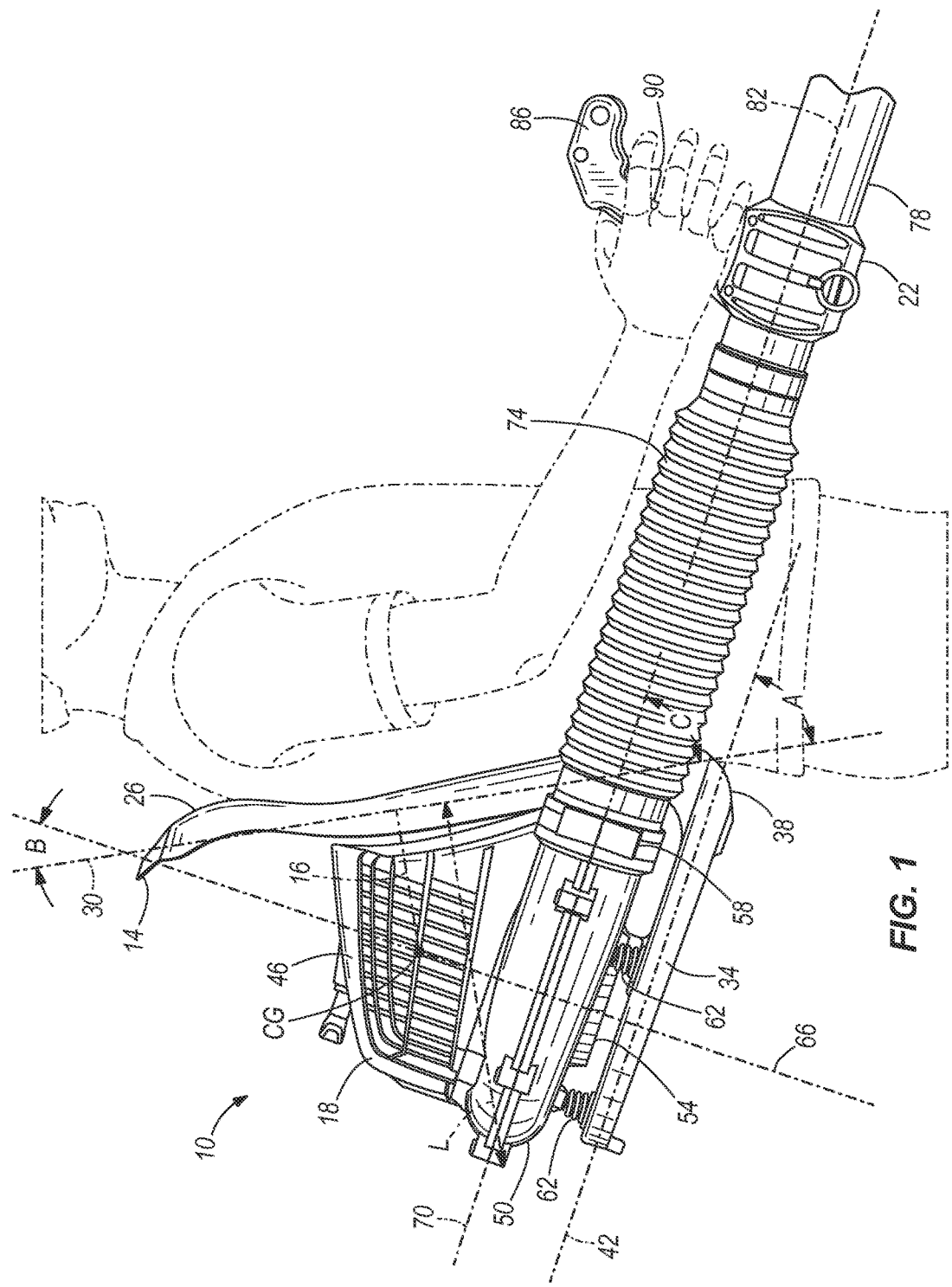
FIG. 1 is a first side view of a backpack leaf blower according to one embodiment of the invention, and being worn by a user.
Figure 2:
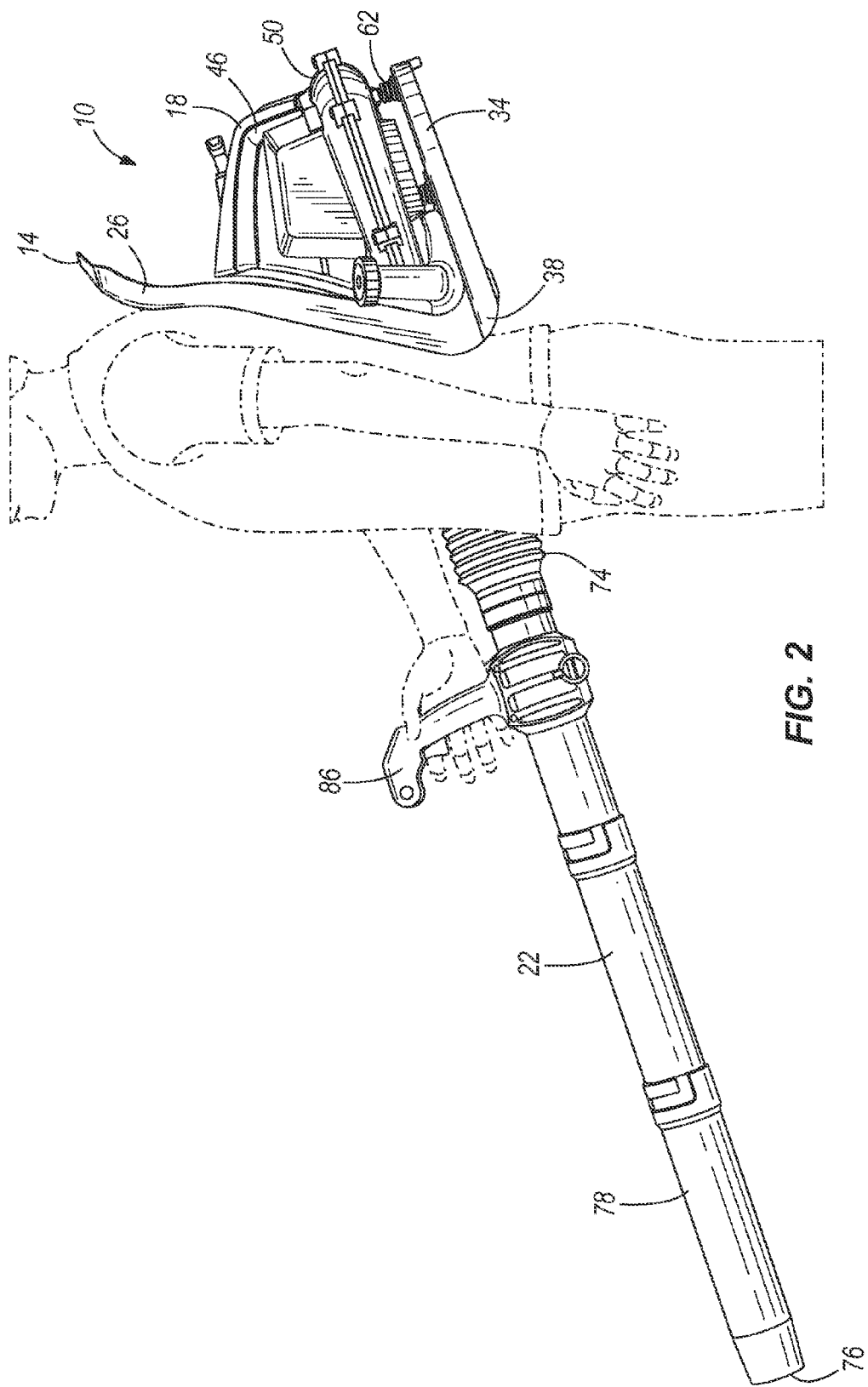
FIG. 2 is a second side view of the leaf blower shown in FIG. 1.
Figure 3:
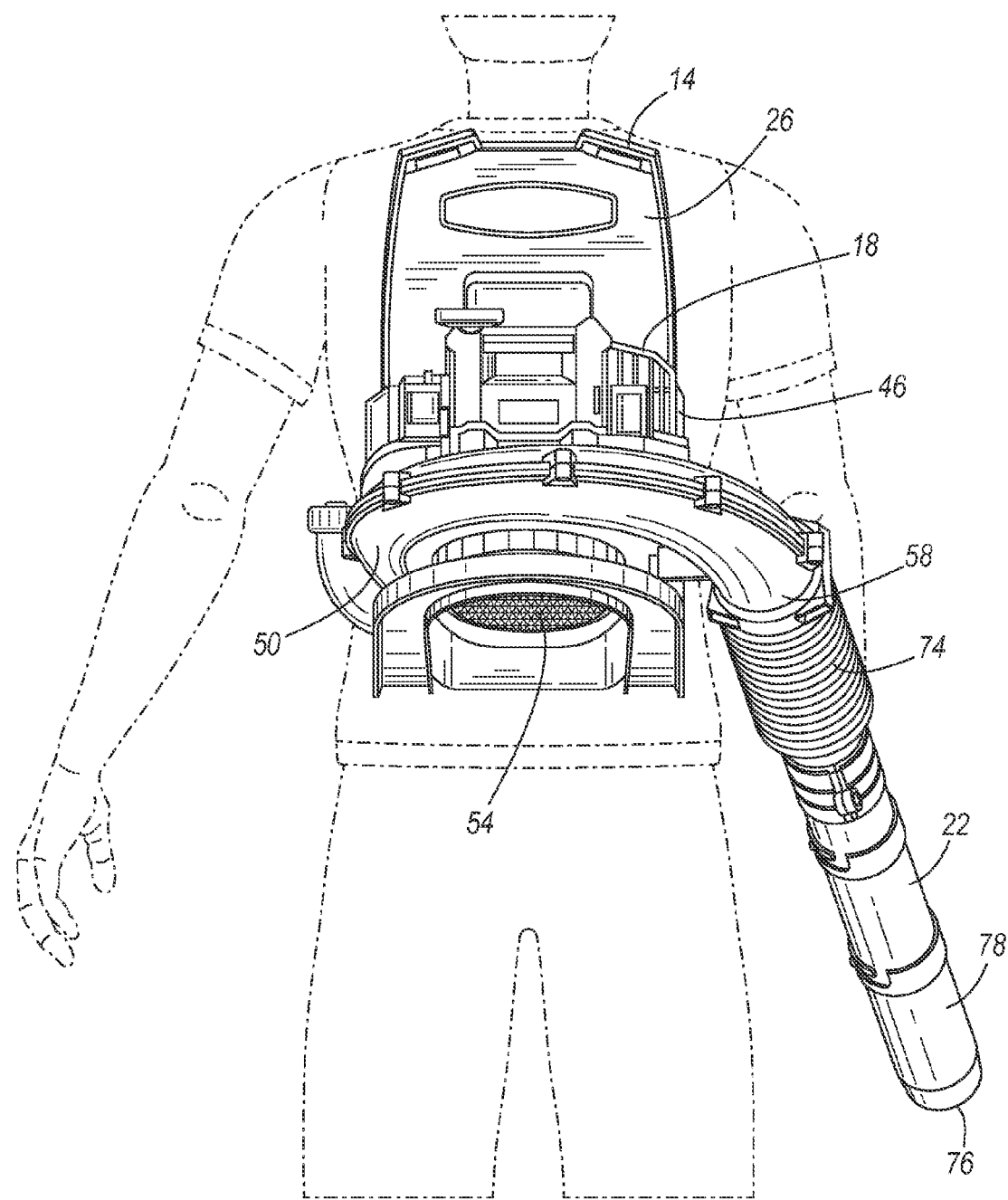
FIG. 3 is a rear view of the leaf blower shown in FIG. 1.

Illustrated in FIGS. 1 and 2, the frame 14 of the leaf blower 10 provides a mounting point for the blower system 18 and is shaped to be worn comfortably by the user. In the illustrated embodiment, the frame 14 is substantially "L" shaped, having a back plate 26 defining a back plate plane 30, and a base plate 34 extending from a bottom 38 of the back plate 26 and defining a base plate plane 42. When the leaf blower 10 is worn, the back plate 26 of the frame 14 contacts the user's back and is generally aligned with the user's spine (FIG. 1). In some embodiments, the back plate 26 may be contoured to better correspond to the curvature of a user's back. In other embodiments, the back plate 26 may include padding, such as foam or fabric, to increase comfort.

The base plate 34 of the frame 14 extends from the back plate 26 proximate the bottom 38, and forming an angle A therewith. The angle A is preferably between about 55 degrees and about 85 degrees, and in the illustrated embodiment is about 65 degrees.

Figure 4:
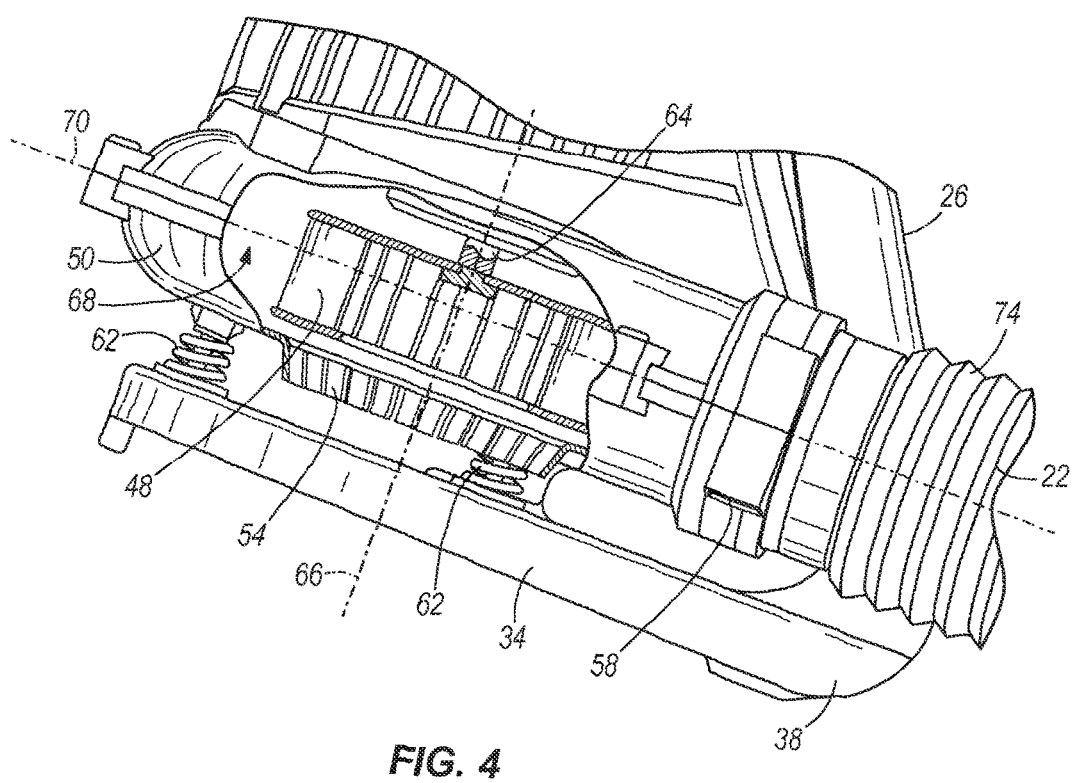
FIG. 4 is a partial section view of a blower system of the backpack leaf blower shown in FIG. 1.

Illustrated in FIGS. 1, 2 and 4, the blower system 18 is coupled to the frame 14 and includes a motor 46, an impeller 48 driven by the motor 46, and a housing 50 at least partially encompassing the impeller 48 and having an air inlet 54 and an air outlet 58. During use, the motor 46 drives (e.g., rotates) the impeller 48 causing it to draw air into the air inlet 54 to be exhausted through the outlet 58 under pressure. More specifically, the illustrated blower system 18 is a centrifugal type blower, having an impeller 48 that draws air axially through the inlet 54 to be centrifugally forced out the outlet 58.

In the illustrated embodiment, the blower system 18 is coupled to the frame 14 by three vibration isolating members 62 (e.g., rubber gaskets, springs, and the like). In the illustrated embodiment, the vibration isolating members 62 extend between the blower system 18 and the frame 14 (e.g., the base plate 34). During use, the vibration isolating members 62 at least partially absorb and dissipate any vibrations formed by the blower system 18 during use. In other embodiments, fewer or more isolating members 62 may be used.

The motor 46 of the blower assembly includes a drive shaft 64 defining an axis 66 therethrough. When the blower assembly 18 is assembled, the axis 66 of the drive shaft 64 forms an angle B with respect to the back plate plane 30 (FIG. 1). The angle B is preferably between about 5 degrees and about 35 degrees, and in the illustrated embodiment is about 25 degrees. In the illustrated embodiment, the motor 46 is an internal combustion type motor, however in other embodiments, an electric motor or other type of power source may be used.

The orientation of the motor 46 with respect to the frame 14 allows the motor's center of gravity CG to be placed closer to the user's back, thereby making the backpack leaf blower 10 more comfortable and easier to carry. More specifically, a distance 16 between the center of gravity CG and the back plate 26 (i.e., $CG_S$) is less than half the overall length L of the leaf blower 10, when each distance is measured perpendicularly from the back plate 26 (i.e., $CG_D$<L/2).

Referring to FIG. 4, the housing 50 of the blower system 18 defines a chamber 68 defining the air inlet 54 and the air outlet 58. During operation, the motor 26 rotates the impeller 48 within the housing 50, causing air to be drawn in through the inlet 54 and exhausted, under pressure, through the outlet 58. Although not illustrated, the housing 50 may include one or more channels or walls to direct air within the chamber 68. The housing 50 also defines a working plane 70, substantially perpendicular to the axis of rotation 66 of the impeller 48. In the illustrated embodiment, the working plane 70 forms an angle C with respect to the back plate plane 30. The angle C is between about 55 degrees and about 85 degrees, and in the illustrated embodiment is about 65 degrees.

The output tube 22 extends from the air outlet 58 of the housing 50 and directs the high pressure exhaust of the blower system 18. In the illustrated embodiment, the output tube 22 includes a flexible portion 74 connected to the air outlet 58 and a rigid portion 78 extending from the flexible portion 74 to a tube outlet 76. When assembled, the user may adjust the rigid portion 78, using it as a nozzle to direct the high pressure air stream from the blower system 18. When the flexible portion 74 is straight and aligned with the rigid portion 78 (e.g., a "straightened configuration"), the output tube 22 extends along a tube axis 82.

In the illustrated embodiment, the tube axis 82 of the output tube 22 is alignable with and to lie in the working plane 70 of the housing 50 (FIG. 1). Also, in the illustrated embodiment, when the rigid portion 78 of the output tube 22 is in a rested position (e.g., the flexible portion 74 is straight (the straightened configuration)), the axis 82 is substantially perpendicular to the axis of rotation of the impeller 48 (and to the axis 66 of the drive shaft 64). By being aligned with and lying in the working plane 70 of the housing 50, the high pressure air flow produced by the blower system 18 exits directly from the outlet 58 and through the output tube 22 without encountering any unnecessary resistance (e.g., by traveling through an elbow tube and the like).

The output tube 22 also includes a control handle 86 coupled to the rigid portion 78 to help the user control the orientation of the output tube 22. In the illustrated embodiment, the control handle 86 includes one or more controls 90, such as a trigger or throttle, to set the motor speed, ignition, and the like.

Although the invention is described with regards to a leaf blower, in further embodiments the same geometry and orientations may be used in other designs, such as blower vacs and the like.

Although the invention has been described in detail with reference to certain preferred embodiments, variations and modifications exist within the scope and spirit of one or more independent aspects of the invention as described.

The invention claimed is:

1. A leaf blower to be worn by a user, the leaf blower comprising:
   a frame including a back plate and a base plate extending from the back plate, a fixed angle being formed between the back plate and the base plate, the fixed angle being between about 55 degrees and about 85 degrees; and
   a blower system coupled to the base plate of the frame, the blower system including an impeller and a housing at least partially encompassing the impeller and defining an inlet and a housing outlet, the blower system defining a working plane that is substantially perpendicular to the axis of rotation of the impeller, and wherein the working plane is also substantially parallel to the base plate.

2. The leaf blower of claim 1, wherein the fixed angle is about 65 degrees.

3. A leaf blower to be worn by a user, the leaf blower comprising:
   a frame including a back plate defining a back plate plane and a base plate extending from the back plate, a first fixed angle being formed between the back plate and the base plate, the first fixed angle being between about 55 degrees and about 85 degrees; and
   a blower system coupled to the base plate of the frame, the blower system including a motor having a drive shaft, the drive shaft having a lower end positioned toward the base plate and an opposite upper end positioned closer to the back plate, the drive shaft defining a shaft axis extending between the lower end and the upper end, the shaft axis forming a second angle with the back plate plane between about 5 degrees and about 35 degrees.

4. The leaf blower of claim 3, wherein the second angle is about 25 degrees.

5. The leaf blower of claim 3, wherein the motor defines a center of gravity, and wherein a distance between the back plate plane and the center of gravity is less than half an overall length of the leaf blower when the distance and the overall length are measured perpendicularly from the back plate plane.

* * * * *